US011022209B2

(12) United States Patent
Baraggia Au Yeung et al.

(10) Patent No.: US 11,022,209 B2
(45) Date of Patent: Jun. 1, 2021

(54) SCAVENGE SYSTEM FOR GEAR ASSEMBLY

(71) Applicant: GE Avio S.r.l., Rivalta di Torino (IT)

(72) Inventors: Saypen Baraggia Au Yeung, Valenza (IT); Giulio Zagato, Moncalieri (IT)

(73) Assignee: GE Avio S.r.l., Rivalta di Torino (IT)

( * ) Notice: Subject to any disclaimer, the term of this patent is extended or adjusted under 35 U.S.C. 154(b) by 0 days.

(21) Appl. No.: 16/278,883

(22) Filed: Feb. 19, 2019

(65) Prior Publication Data
US 2019/0271385 A1 Sep. 5, 2019

(30) Foreign Application Priority Data

Mar. 2, 2018 (IT) .................. 102018000003231

(51) Int. Cl.
*F16H 57/04* (2010.01)
*F02C 7/36* (2006.01)
(Continued)

(52) U.S. Cl.
CPC ....... *F16H 57/046* (2013.01); *F16H 57/0409* (2013.01); *F16H 57/0423* (2013.01); *F16H 57/0457* (2013.01); *F16H 57/0479* (2013.01); *F16H 57/0486* (2013.01); *F01D 25/18* (2013.01); *F02C 7/36* (2013.01); *F03D 15/00* (2016.05); *F03D 80/70* (2016.05); *F05B 2260/40311* (2013.01); *F05B 2260/98* (2013.01); *F05D 2260/40311* (2013.01); *F05D 2260/98* (2013.01)

(58) Field of Classification Search
CPC .............. F16H 57/046; F16H 57/0409; F16H 57/0423; F16H 57/0457; F16H 57/0479; F16H 57/0486; F16H 57/04; F03D 80/70; F01D 25/18; F02C 7/36; F05B 2260/98; F05D 2260/98
See application file for complete search history.

(56) References Cited

U.S. PATENT DOCUMENTS

| 5,472,383 A | 12/1995 | McKibbin |
| 6,039,667 A | 3/2000 | Schunck et al. |

(Continued)

FOREIGN PATENT DOCUMENTS

| CN | 102829166 B | 9/2014 |
| CN | 102829166 B | 9/2014 |
| EP | 2719927 | 4/2014 |

OTHER PUBLICATIONS

Italian Search Report and Written Opinion dated Oct. 18, 2018 which was issued in connection with IT102018000003231 which was filed on Mar. 2, 2018.

(Continued)

*Primary Examiner* — Huan Le
(74) *Attorney, Agent, or Firm* — Dority & Manning, P.A.

(57) ABSTRACT

A gear assembly including a first gear disposed at a centerline axis of the gear assembly; a second gear coupled to the first gear in adjacent radial arrangement; and a spraybar assembly disposed between a plurality of the second gear. The spraybar assembly defines an elongated neck extended between the plurality of second gear. A supply opening is defined through the elongated neck and the elongated neck defines a groove extended along a longitudinal direction.

17 Claims, 5 Drawing Sheets

(51) Int. Cl.
*F01D 25/18* (2006.01)
*F03D 80/70* (2016.01)
*F03D 15/00* (2016.01)

(56) References Cited

U.S. PATENT DOCUMENTS

| | | |
|---|---|---|
| 7,704,178 B2 | 4/2010 | Sheridan et al. |
| 7,883,439 B2 | 2/2011 | Sheridan et al. |
| 8,172,716 B2 | 5/2012 | McCune |
| 8,246,503 B2 | 8/2012 | Sheridan et al. |
| 8,276,275 B2 | 10/2012 | Sheridan et al. |
| 8,667,688 B2 | 3/2014 | McCune et al. |
| 8,763,251 B2 | 7/2014 | McCune et al. |
| 8,898,900 B2 | 12/2014 | Sheridan et al. |
| 8,935,853 B2 | 1/2015 | Sheridan et al. |
| 8,939,714 B1 | 1/2015 | McCune et al. |
| 9,038,779 B2 | 5/2015 | McCune et al. |
| 9,759,309 B2 | 9/2017 | Sheridan et al. |
| 9,777,825 B2 | 10/2017 | Sheridan et al. |
| 2014/0106922 A1 | 4/2014 | Hancox |
| 2015/0065285 A1* | 3/2015 | McCune .................. F02C 7/36 475/159 |
| 2015/0267802 A1 | 9/2015 | Sheridan et al. |
| 2016/0146102 A1 | 5/2016 | McCune et al. |
| 2016/0146112 A1 | 5/2016 | Van der Merwe et al. |
| 2016/0377165 A1 | 12/2016 | Sheridan |

OTHER PUBLICATIONS

Italy Office Action dated Oct. 21, 2018.
Italy Search Report IT201800003231 dated Mar. 2, 2018.

\* cited by examiner

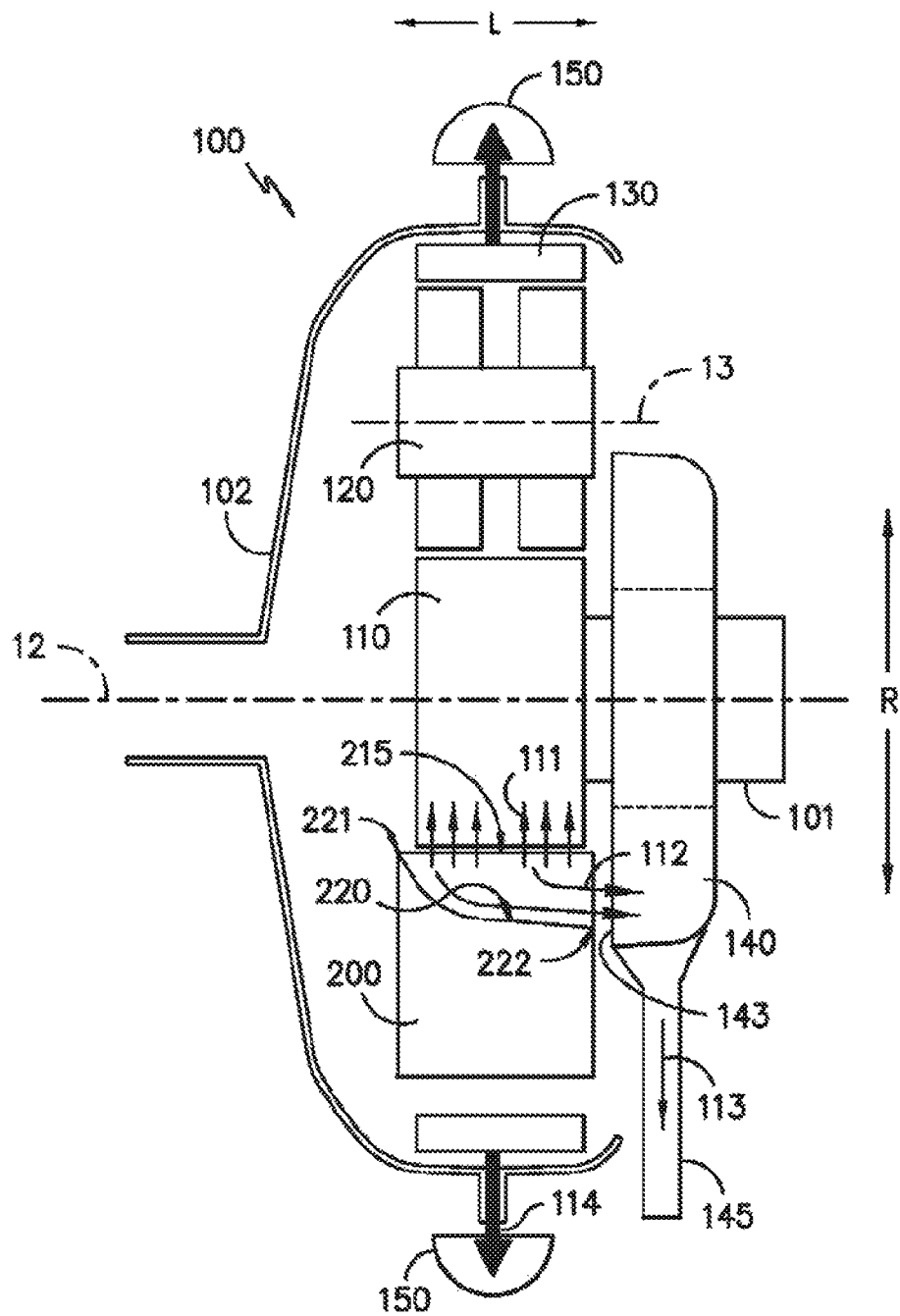
FIG. -1-

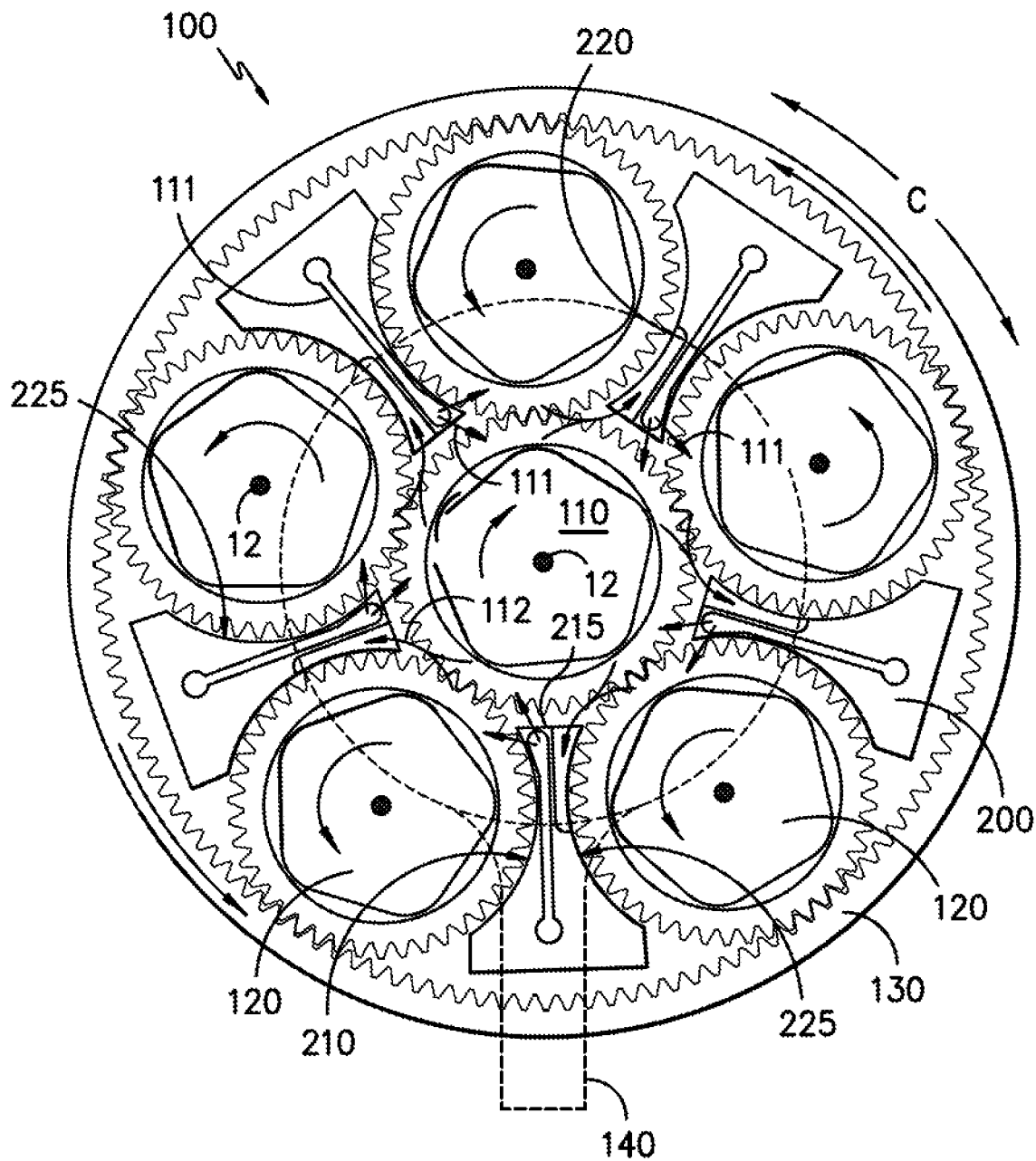
FIG. -2-

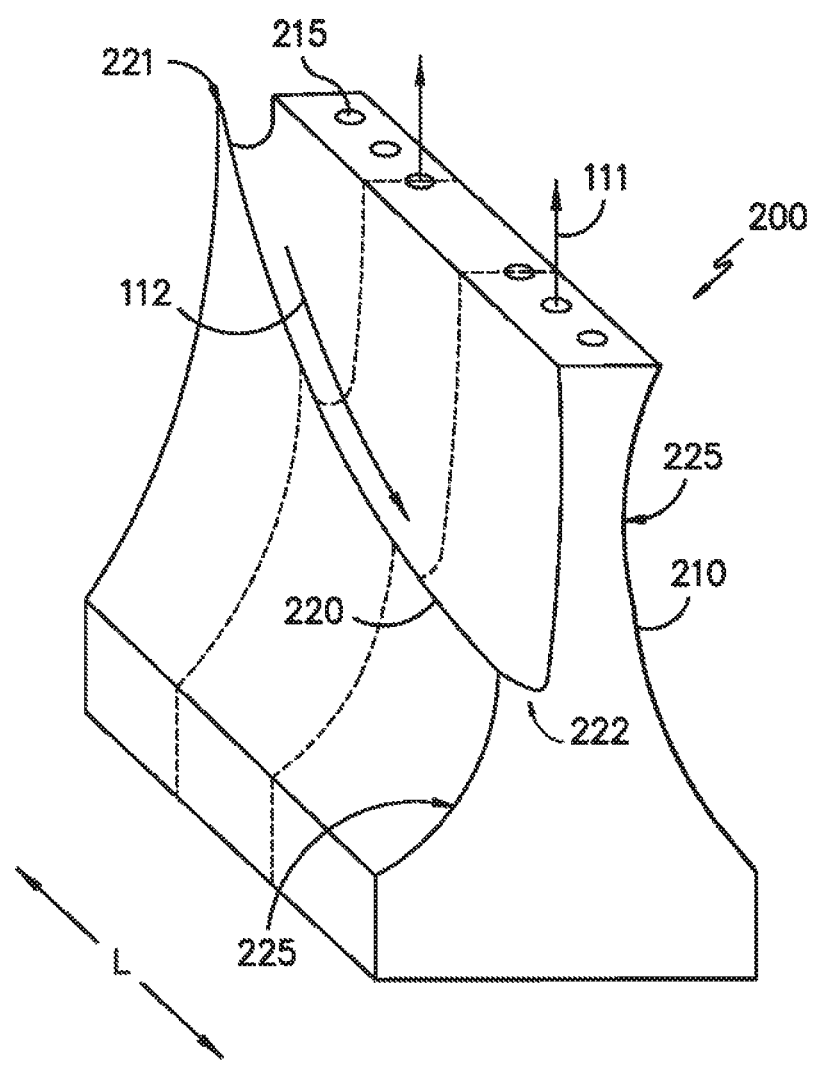
FIG. -3-

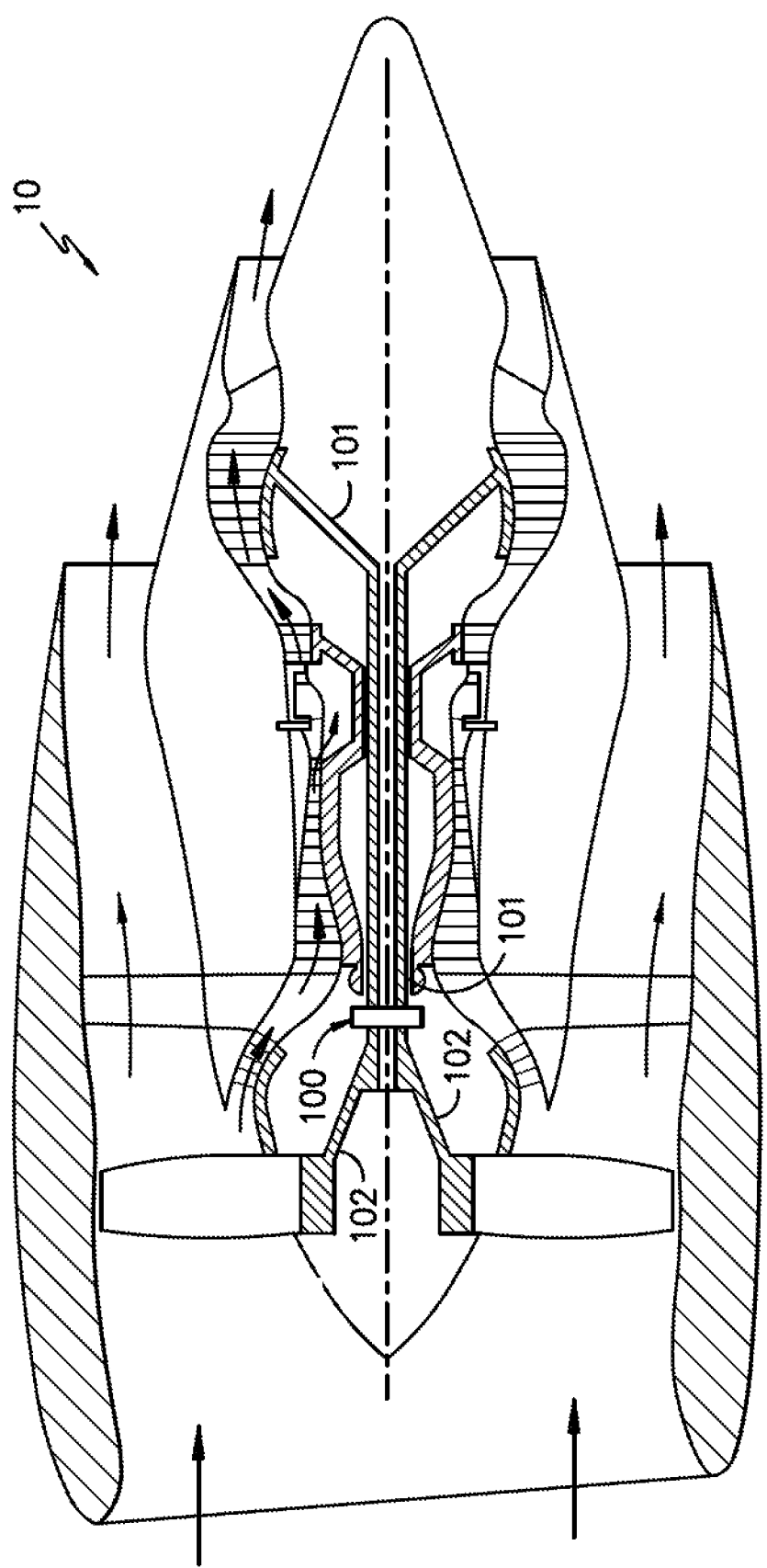
FIG. -4-

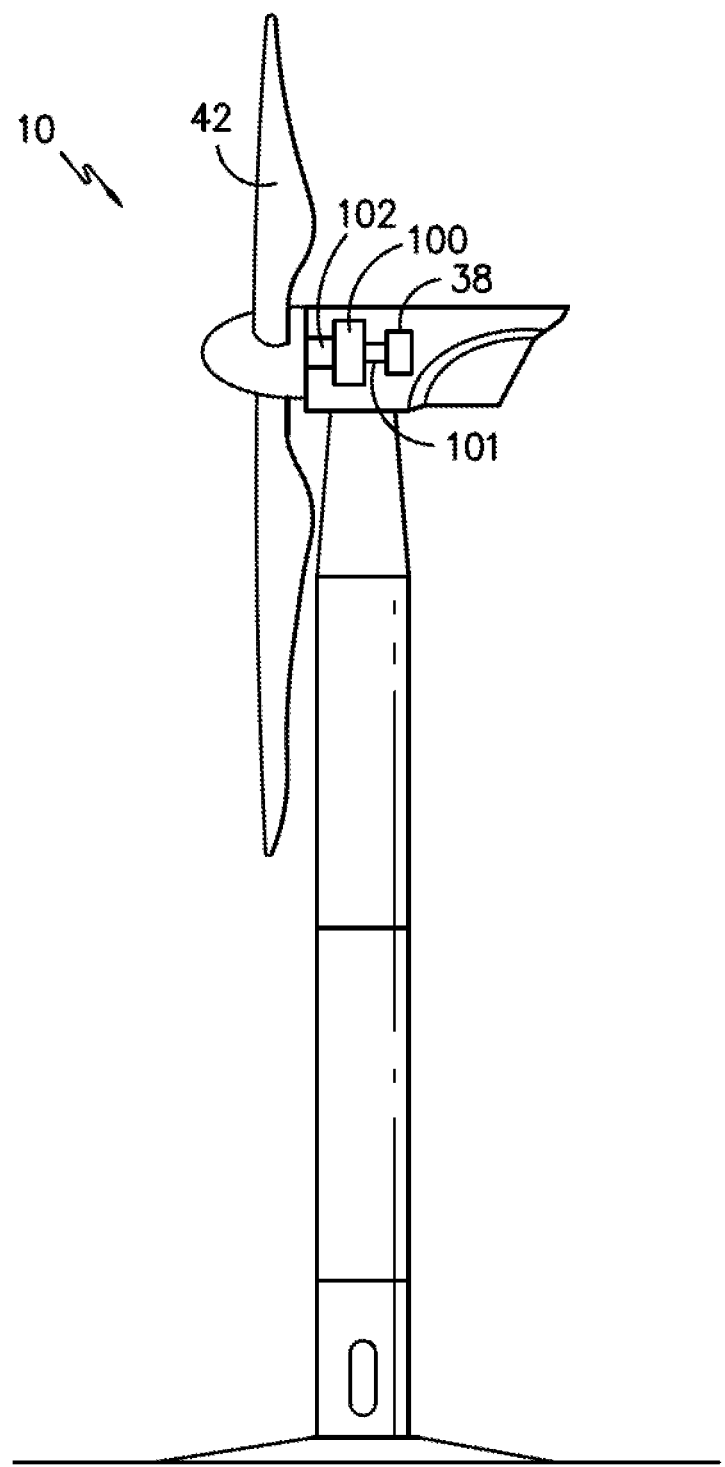
FIG. -5-

SCAVENGE SYSTEM FOR GEAR ASSEMBLY

FIELD

The present subject matter relates generally to gear assemblies.

BACKGROUND

Mechanical and electro-mechanical systems, such as turbine engines including industrial and aviation gas turbines and wind turbines, include gear assemblies to change an input or output rotational speed between two or more shafts such as to optimize turbine engine efficiency and performance. Lubricant systems for such gear assemblies are designed to supply and scavenge lubricant injected into gear meshes. However, the lubricant injected into the gear meshes may result in gear assembly power losses when lubricant is insufficiently scavenged from the gear assembly. Furthermore, lubricant systems and gear assemblies may create a limit as to the quantity of lubricant required and the size of the lubricant system and/or gear assembly.

As such, there is a need for a gear assembly and lubricant system that improves lubricant scavenging and reduces gear assembly power losses, lubricant quantities, and improves system efficiency.

BRIEF DESCRIPTION

Aspects and advantages of the invention will be set forth in part in the following description, or may be obvious from the description, or may be learned through practice of the invention.

The present disclosure is directed to a gear assembly including a first gear disposed at a centerline axis of the gear assembly; a second gear coupled to the first gear in adjacent radial arrangement; and a spraybar assembly disposed between a plurality of the second gear. The spraybar assembly defines an elongated neck extended between the plurality of second gear. A supply opening is defined through the elongated neck and the elongated neck defines a groove extended along a longitudinal direction.

In various embodiments, the spraybar assembly defines the groove defining a curve directing a flow of lubricant along the longitudinal direction. In one embodiment, the spraybar assembly defines the groove defining the curve from a radially inward end proximate to the supply opening toward a radially outward end. In another embodiment, the spraybar assembly defines the groove adjacent to the supply opening defined through the elongated neck.

In one embodiment, the groove is defined circumferentially adjacent to the second gear.

In various embodiments, the gear assembly further includes a first lubricant collector disposed adjacent to the spraybar assembly. In one embodiment, the first lubricant collector is disposed longitudinally adjacent to the groove of the spraybar assembly. In still various embodiments, a scavenge opening is defined through the first lubricant collector adjacent to the groove of the spraybar assembly. In one embodiment, the spraybar assembly defines the groove extended along the longitudinal direction from a radially inward end toward a radially outward end adjacent to the scavenge opening defined through the first lubricant collector. In still other embodiments, the first lubricant collector is defined substantially circumferentially relative to the centerline axis. In still yet other embodiments, the first lubricant collector further defines a scavenge port extended substantially along a radial direction relative to the centerline axis.

In various embodiments, the gear assembly further includes a first shaft disposed substantially concentric to the centerline axis in which first shaft is coupled to the first gear. In one embodiment, the first shaft is disposed through the first lubricant collector.

In one embodiment, the first gear defines a sun gear rotatable around the centerline axis of the gear assembly. The second gear defines a planet gear meshed with the first gear.

In another embodiment, the gear assembly further includes a third gear coupled to the second gear.

Another aspect of the present disclosure is directed to a mechanical or electro-mechanical system including the gear assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIGS. 1-2 are exemplary embodiments of a gear assembly according to aspects of the present disclosure;

FIG. 3 is an exemplary embodiment of a spraybar assembly of the gear assembly according to an aspect of the present disclosure; and FIGS. 4-5 are exemplary embodiments of systems incorporating exemplary embodiments of the gear assembly of FIGS. 1-3.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Approximations recited herein may include margins based on one more measurement devices as used in the art, such as, but not limited to, a percentage of a full scale measurement range of a measurement device or sensor. Alternatively, approximations recited herein may include margins of 10% of an upper limit value greater than the upper limit value or 10% of a lower limit value less than the lower limit value.

Embodiments of a gear assembly and lubricant system that improves lubricant scavenging and reduces gear assembly power losses, lubricant quantities, and improves system efficiency are generally provided. The gear assembly includes a spraybar assembly defined to provide a longitudinal velocity component to the flow of lubricant to scavenge the lubricant and avoid lubricant recirculation. The spraybar assembly is able to utilize kinetic energy from the flow of lubricant between the gears of the gear assembly to dispose the flow of lubricant along the longitudinal direction to a lubricant collector. Avoiding lubricant recirculation and losses in kinetic energy of the flow of lubricant between the gears avoids decreases in resistant torque and associated undesired heat generation. As such, the gear assembly enables reductions in the quantity of lubricant required at the gear assembly, thereby improving overall system efficiency and performance.

Referring now to FIGS. 1-2, exemplary embodiments of a gear assembly 100 according to an aspect of the present disclosure are generally provided. FIG. 1 provides a longitudinal side view of the gear assembly 100 generally provided in FIG. 2. FIG. 2 provides a circumferential view of the gear assembly 100 generally provided in FIG. 1. The gear assembly 100 defines a longitudinal direction L co-directional to a reference longitudinal centerline axis 12 extended through the gear assembly 100. A reference radial direction R is extended from the centerline axis 12. A reference circumferential direction C is extended relative to the centerline axis 12.

The gear assembly 100 includes a first gear 110 disposed at the centerline axis 12. A second gear 120 is coupled to the first gear 110 in adjacent arrangement along the radial direction R. The first gear 110 and the second gear 120 are meshed together. A third gear 130 is further defined around and meshed together with a plurality of the second gear 120, as shown in FIG. 2.

In various embodiments, the gear assembly 100 defines an epicyclical gear assembly. For example, the first gear 110 may generally define a sun gear rotatable around the centerline axis 12. The second gear 120 may generally define a planet gear coupled or meshed with the first gear 110 defining a sun gear. The third gear 130 may generally define a ring gear coupled or meshed with the second gear 120. In various embodiments not depicted, a plurality of the second gear 120 may be disposed in radial arrangement, e.g., two or more of the second gear 120 in radial arrangement between the third gear 130 and the first gear 110. In still other embodiments, the gear assembly 100 may define a compound planetary gear assembly. For example, the second gear 120 may include two or more gears coupled with a shaft disposed through the second gear 120.

The gear assembly 100 further includes a first shaft 101 coupled to the first gear 110. The first shaft 101 may be defined substantially concentric to the centerline axis 12. The gear assembly 100 further includes a second shaft 102. In various embodiments, the plurality of second gear 120 may be coupled to the second shaft 102 via a carrier (not shown). As such, rotation of the first gear 110 and the first shaft 101 enables rotation of each second gear 120 around a respective second gear axis 13. Furthermore, rotation of the second gear axis 13 around the first gear 110 (i.e., around the centerline axis 12) is enabled. The second shaft 102 coupled to the second gear 120 rotates around the centerline axis 12 along with the second gear 120. The third gear 130 may generally contain or mesh the second gear 120 with the first gear 110.

In other embodiments, the second shaft 102 may be coupled to the third gear 130. The second gear 120 may transfer energy between the first gear 110 and the third gear 130. As such, the second gear 120 may rotate about its second gear axis 13 while the second gear axis 13 remains stationary relative to the centerline axis 12 (i.e., the second gear axis 13 does not rotate around the centerline axis 12).

The gear assembly 100 further includes a spraybar assembly 200 disposed between a plurality of the second gear 120. An exemplary perspective view of the spraybar assembly 200 is generally provided in regard to FIG. 3. Referring to FIGS. 1-3, the spraybar assembly 200 defines an elongated neck 210 extended between the plurality of second gear 120. A supply opening 215 is defined through the elongated neck 210.

The elongated neck 210 further defines a groove 220. The groove 220 is extended along the longitudinal direction L relative to the gear assembly 100. In various embodiments, the groove 220 defines a curve directing a flow of lubricant generally along the longitudinal direction L. For example, the spraybar assembly 200 may define the groove 220 adjacent to the supply opening 215. As another example, the groove 220 is defined adjacent to the second gear 120 along the circumferential direction C. As such, the groove 220 may be defined between the second gear 120 and the supply opening 215 defined through the elongated neck 210.

Referring to the exemplary embodiment provided in FIG. 2, the spraybar assembly 200 is disposed between circumferentially adjacent pairs of the second gear 120. In various embodiments, the elongated neck 210 is extended along the radial direction R relative to the centerline axis 12. The elongated neck 210 further defines a curvature 225 along the radial direction R. In one embodiment, such as generally provided in FIG. 2, the curvature 225 may substantially correspond to a radius of the second gear 120 relative to the second gear axis 13.

In still various embodiments, the spraybar assembly 200 defines the groove 220 defining the curve from inward along the radial direction R (i.e., more proximate to the centerline axis 12) to outward along the radial direction (i.e., less proximate to the centerline axis 12). For example, the spraybar assembly 200 may define the groove 220 from a radially inward end 221 proximate to the supply opening 215 toward a radially outward end 222.

Referring back to FIG. 1, in conjunction with FIGS. 2-3, the gear assembly 100 may further include a first lubricant collector 140 disposed adjacent to the spraybar assembly 200. For example, the first lubricant collector 140 is disposed adjacent along the longitudinal direction L to the groove 220 defined at the spraybar assembly 200. In various embodiments, a scavenge opening 143 is defined through the first lubricant collector 140 adjacent to the groove 220 of the spraybar assembly 200. In one embodiment, the spraybar assembly 200 defines the groove 220 extending generally along the longitudinal direction L from a location 221 inward along the radial direction R towards a location 222 outward along the radial direction R. The radially outward end 222 of the groove 220 is adjacent to the scavenge opening 143 defined through the first lubricant collector 140. For example, the radially outward end 222 of the groove 220 may be adjacent along the longitudinal direction L to the scavenge opening 143 such as generally provided in regard to FIG. 1.

Referring still to FIG. 1, the first lubricant collector 140 further defines a scavenge port 145 extended substantially along the radial direction R relative to the centerline axis 12. In still another embodiment, such as generally provided in regard to FIG. 2, the first lubricant collector 140 is defined substantially circumferentially or annular relative to the centerline axis 12. In various embodiments, the first lubricant collector 140 is further disposed substantially concentric to the centerline axis 12. For example, the first lubricant collector 140 may be disposed around the first shaft 101. As another example, the first shaft 101 is extended at least partially through the first lubricant collector 140.

In various embodiments, such as generally shown in FIG. 1, the gear assembly 100 may further include a second lubricant collector 150. In one embodiment, the second lubricant collector 150 is disposed outward of the third gear 130 along the radial direction R. Referring to FIGS. 1-3, during operation of the gear assembly 100, a flow of lubricant, shown schematically by arrows 111, is supplied to the first gear 110 and the second gear 120 from the spraybar assembly 200 via the supply opening 215. Kinetic energy from the supply flow of lubricant 111 from the spraybar assembly 200 and/or from between the first gear 110 and the second gear 120 is utilized and harnessed by the spraybar assembly 200 to scavenge the flow of lubricant via the groove 220, such as shown schematically by arrows 112. For example, the curve of the groove 220 from the radially inward end 221 to the radially outward end 222 of the groove 220 utilizes and maintains kinetic energy from the flow of lubricant 111 from between the first gear 110 and the second gear 120 to direct the flow of lubricant 112 to the scavenge opening 143 at the first lubricant collector 140. More specifically, the curve of the groove 220 along the longitudinal direction L directs the scavenge flow of lubricant 112 longitudinally to the scavenge opening 143 at the first lubricant collector 140. The first lubricant collector 140 may then direct the flow of lubricant from the first lubricant collector 140 via the scavenge port 145, such as shown schematically by the radially outwardly extending arrows 113 (as shown, for example, in FIG. 1). Still another flow of lubricant, shown schematically via arrows 114 (as shown, for example, in FIG. 1), may egress the gear assembly 100 via the second lubricant collector 150.

As such, embodiments of the gear assembly 100 generally shown and described in regard to FIGS. 1-3 may increase lubricant scavenge and overall system efficiency by reducing oil recirculation losses that otherwise result from losses due to lubricant acceleration and lubricant squeezing between the first gear 110 and the second gear 120. As such, the improved gear assembly 100 may enable reducing a required supply flow of lubricant, thereby enabling reduced system weight, such as via carrying less lubricant, reduced manifold length/diameter, reduced heat exchanger sizes due to less lubricant mass or volume, or a reduced magnitude of heat transfer via the heat exchanger due to improved system efficiency. Still further, the gear assembly 100 enables reduced gravity or substantially zero gravity operation (e.g., zero gravity or parabolic flight maneuvers).

Referring now to FIGS. 4-5, exemplary embodiments of systems 10 into which one or more exemplary embodiments of the gear assembly 100 shown and described in regard to FIGS. 1-3 are generally provided. The systems 10 depicted generally include turbine engines, such as, but not limited to, gas turbine engines (FIG. 4) and wind turbines (FIG. 5). The gear assembly 100 enables a speed change between a first shaft 101 and a second shaft 102. For example, regarding FIG. 4, the system 10 defining a gas turbine engine may define a turboprop, turboshaft, or turbofan engine configuration including the gear assembly 100. The gear assembly 100 may be disposed in serial energy flow arrangement between the first shaft 101 (e.g., a low pressure or low speed shaft) and the second shaft 102 (e.g., fan or propeller assembly) such as to reduce an output speed from the first shaft 101 to the second shaft 102. As another example, regarding FIG. 5, the system 10 defining a wind turbine including the gear assembly 100 may be disposed in serial energy flow arrangement between the second shaft 102 (e.g., coupled to wind turbine blades 42) and the first shaft 101 (e.g., coupled to a generator 38) such as to increase an output speed from the second shaft 102 to the first shaft 101.

The systems 10 into which the gear assembly 100 is coupled are provided by way of example. As such, it should be appreciated that the exemplary embodiments of the gear assembly 100 shown and described in regard to FIGS. 1-3 may be applied to other mechanical or electro-mechanical systems not shown herein.

Embodiments of the gear assembly 100 generally shown and described herein may be produced using one or more manufacturing methods known in the art. For example, the gear assembly 100, including, but not limited to, the gears 110, 120, 130, the lubricant collectors 140, 150, or the spraybar assembly 200 may be manufactured via one or more processes known as additive manufacturing or 3D printing, machining processes, forgings, castings, etc., or combinations thereof. Still further, the spraybar assembly 200 may be formed into the gear assembly 100, such as via one or more of the processes described herein, or via a bonding process (e.g., welding, brazing, adhesive, bonding, etc.), or mechanical fasteners (e.g., bolts, nuts, screws, rivets, tie rods, etc.), or otherwise adhering the spraybar assembly 200 such as shown and described in the various embodiments herein. Alternatively, or additionally, various components of the gear assembly 100 may be formed via a material removal process, such as, but not limited to, a machining process (e.g., cutting, milling, grinding, boring, etc.).

Further embodiments of the gear assembly 100 may define a planetary gear assembly, a compound planetary gear assembly, an epicyclic gear assembly, or other suitable gear assembly for a mechanical or electro-mechanical system. As such, one or more of the first gear 110, the second gear 120, or the third gear 130 may include a plurality of either or each, each of which defining one or more root diameters, outside diameters, pitches, flanks, lands, faces, tooth configurations generally, or rotary/stationary arrangements.

Various embodiments of the gear assembly 100 may specifically define one or more of the gears 110, 120, 130 as a spur gear configuration. As the spur gear configuration may generally define a small velocity component along the longitudinal direction L relative to other gear configurations, embodiments of the spraybar assembly 200 and/or first lubricant collector 140 shown and described herein enable directing the flow of lubricant from between the gears 110, 120, 130 along the longitudinal direction L to improve scavenging of the lubricant. However, it should be appreciated that other embodiments of the gears 110, 120, 130 may define other suitable gear configurations.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gear assembly, the gear assembly comprising:
   a first gear disposed at a centerline axis of the gear assembly;
   a second gear coupled to the first gear in adjacent radial arrangement;
   a spraybar assembly disposed between a plurality of the second gear, wherein the spraybar assembly defines an elongated neck extended between the plurality of second gear, and wherein a supply opening is defined through the elongated neck, and wherein the elongated neck defines a groove extended along a longitudinal direction; and
   a first lubricant collector disposed adjacent to the spraybar assembly, wherein the first lubricant collector is disposed around a first shaft,
   wherein the first lubricant collector further defines a scavenge port extended substantially along a radial direction relative to the centerline axis.

2. The gear assembly of claim 1, wherein the spraybar assembly defines the groove defining a curve directing a flow of lubricant along the longitudinal direction.

3. The gear assembly of claim 2, wherein the spraybar assembly defines the groove defining the curve from a radially inward end proximate to the supply opening toward a radially outward end.

4. The gear assembly of claim 2, wherein the spraybar assembly defines the groove adjacent to the supply opening defined through the elongated neck.

5. The gear assembly of claim 1, wherein the groove is defined circumferentially adjacent to the second gear.

6. The gear assembly of claim 1, wherein the first lubricant collector is disposed longitudinally adjacent to the groove of the spraybar assembly.

7. The gear assembly of claim 1, wherein a scavenge opening is defined through the first lubricant collector adjacent to the groove of the spraybar assembly.

8. The gear assembly of claim 7, wherein the spraybar assembly defines the groove extended along the longitudinal direction from a radially inward end toward a radially outward end adjacent to the scavenge opening defined through the first lubricant collector.

9. The gear assembly of claim 1, wherein the first lubricant collector is defined substantially circumferentially relative to the centerline axis.

10. The gear assembly of claim 1, wherein the first shaft is disposed substantially concentric to the centerline axis, wherein the first shaft is coupled to the first gear.

11. The gear assembly of claim 10, wherein the first shaft is disposed through the first lubricant collector.

12. The gear assembly of claim 1, wherein the first gear defines a sun gear rotatable around the centerline axis of the gear assembly, and wherein the second gear defines a planet gear meshed with the first gear.

13. The gear assembly of claim 1, further comprising:
    a third gear coupled to the second gear.

14. A mechanical or electro-mechanical system, the system comprising:
    a gear assembly comprising:
      a first gear disposed at a centerline axis of the gear assembly;
      a second gear coupled to the first gear in adjacent radial arrangement;
      a spraybar assembly disposed between a plurality of the second gear, wherein the spraybar assembly defines an elongated neck extended between the plurality of second gear, and wherein a supply opening is defined through the elongated neck, and wherein the elongated neck defines a groove extended along a longitudinal direction; and
      a first lubricant collector disposed adjacent to the spraybar assembly, wherein the first lubricant collector is disposed around a first shaft,
      wherein the first lubricant collector further defines a scavenge port extended substantially along a radial direction relative to the centerline axis.

15. The system of claim 14, wherein the spraybar assembly defines the groove defining a curve directing a flow of lubricant along the longitudinal direction.

16. The system of claim 14, wherein the spraybar assembly defines the groove extended along the longitudinal direction from a radially inward end toward a radially outward end adjacent to a scavenge opening defined through the first lubricant collector.

17. The system of claim 14, wherein the first shaft is disposed substantially concentric to the centerline axis of the gear assembly, wherein the first shaft is coupled to the first gear of the gear assembly; and the system further comprises a third gear coupled to the second gear.

* * * * *